Sept. 5, 1950     W. L. STAFFORD ET AL     2,521,190
PERLITE EXPANDING APPARATUS
Filed May 13, 1948
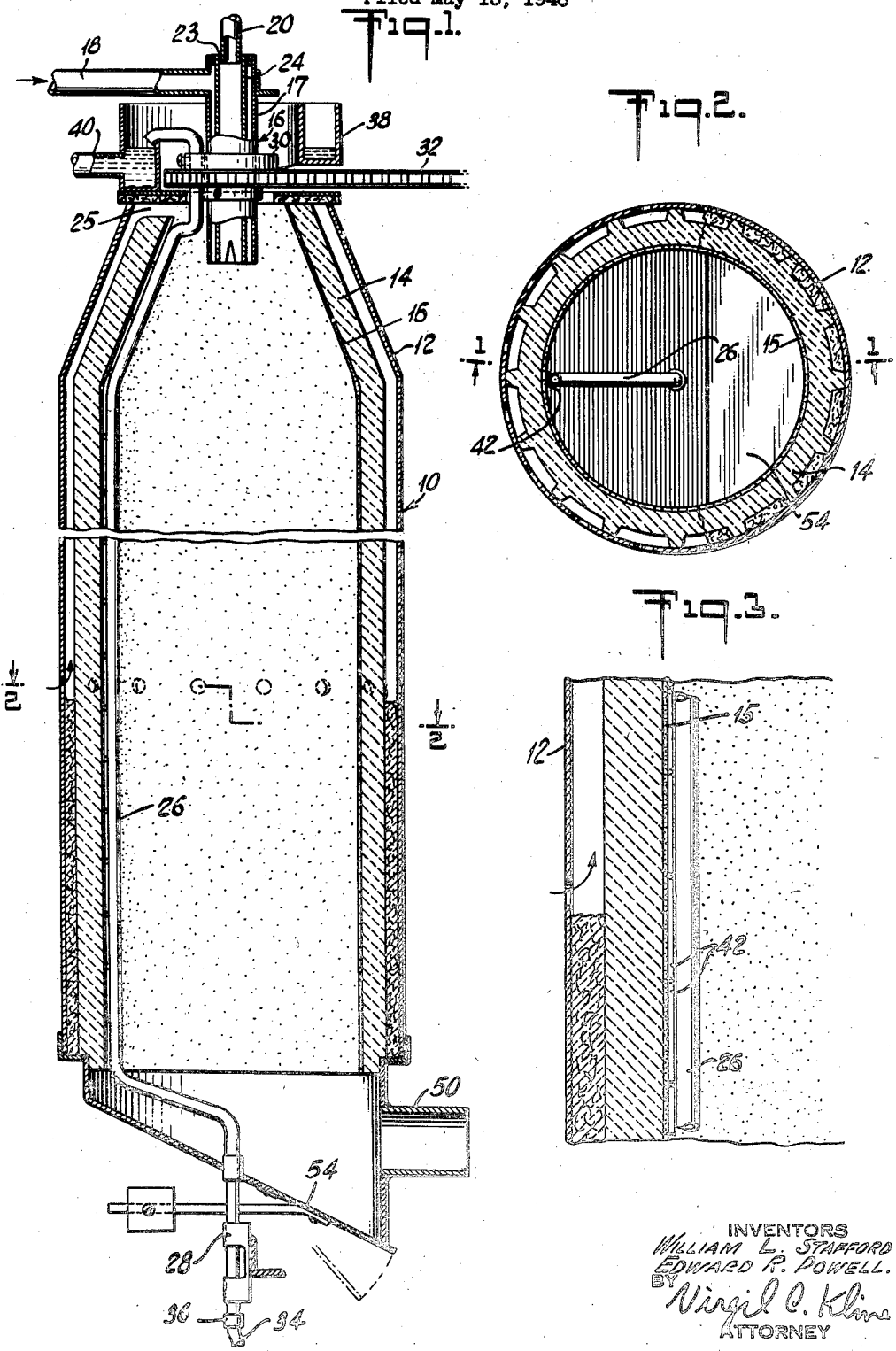
INVENTORS
WILLIAM L. STAFFORD
EDWARD R. POWELL.
BY
Virgil O. Kline
ATTORNEY Patented Sept. 5, 1950

2,521,190

UNITED STATES PATENT OFFICE 2,521,190

PERLITE EXPANDING APPARATUS

William L. Stafford, Somerville, and Edward R. Powell, North Plainfield, N. J., assignors to Johns-Manville Corporation, New York, N. Y., a corporation of New York Application May 13, 1948, Serial No. 26,746

7 Claims. (Cl. 263—21)

This invention is concerned with an improved furnace for heat expanding crude perlite and similar heat expandible minerals.

Crude or raw perlite is volcanic glass having a silica content of about 65–70% by weight, together with about 12–16% alumina, 2–5% entrapped water, 7–10% alkali metal oxides and small amounts of oxides of iron, calcium and magnesium. A characteristic property of perlite and of similar volcanic glasses containing upwards of 2% water, is that when such material is exposed in fine particle form to high temperatures in the range 1600–2100° F., softening and rapid expansion or puffing of the particles takes place to produce a cellular expanded product which may have an extremely low density. Because of its low density, chemical inertness and heat resistance, fully expanded perlite has considerable value as a heat insulating material.

A primary object of the present invention is to provide improvements in apparatus for flash heat expanding perlite and similar heat expandible minerals.

A more particular object is to provide a perlite expanding furnace which is designed for more economical and efficient operation as compared to prior art furnaces.

The present apparatus follows conventional design insofar as it contemplates dispersing crude or raw perlite in finely divided form in air or gas suspension, and feeding the thus dispersed perlite particles into a high temperature flame within a furnace combustion chamber. The temperatures and rate of perlite feed within the combustion chamber are controlled to effect heat softening and rapid expansion or puffing of the softened perlite particles while they are in suspension in the combustion gases. The apparatus is further designed to effect rapid removal of the gas suspension of expanded perlite from the high temperature zone and cooling thereof to harden the expanded cellular product.

Whenever flash heat expansion of perlite takes place while the particles are suspended in a flowing stream of hot gas within a furnace, some of the expanded particles are thrown into contact with the wall lining of the furnace while in heat softened condition, and such particles tend to adhere to the lining and to build up thereon so long as the heat expanding operation proceeds. When the period of sojourn of freshly expanded perlite within a high temperature flash expanding zone is prolonged for any substantial period of time, the heat softened walls of the cells tend to fuse and coalesce to form on cooling a dense clinker which cannot be re-expanded, and which has little value as a heat insulating material.

The present heat expanding furnace in its preferred form departs from prior furnace design in providing a vertical shaft heating chamber with a permanent or semi-permanent and continuously replenished inner wall lining of definite limited thickness, said lining consisting of low density heat expanded perlite. Such expanded perlite lining has extremely high insulating and heat radiating properties, and its presence promotes more economical and efficient heating and higher yields of a high quality expanded perlite than are obtainable in the absence of such inner lining. The present invention also contemplates mounting a water cooled scraper within the furnace which is shaped to the furnace wall and actuated to periodically wipe the inner face of the expended perlite lining at a rate which is adequate, in conjunction with the rate at which deposition of freshly expanded perlite takes place at the inner face of the lining, to preserve high insulating and heat reflecting properties of the lining and to limit build up of thickness thereof to allow for continuous furnace operation. The scraper is mounted for rotation in a fixed path and shaped to maintain an expanded perlite lining of definite thickness with a substantially smooth inner face and to preserve the heat radiating and insulating properties of the lining by inhibiting clinkering, and by removing any fused and coalesced potentially clinkering material before such material has a chance to accumulate and consolidate to a dense clinker structure.

Another feature of the illustrated furnace, which promotes high yields of expanded perlite of low density, consists in mounting straight walled tubular burner and raw perlite feed ducts vertically at the top of the shaft in position to develop substantially streamline non-turbulent vertically downward flow of gas dispersed particles throughout the heat expanding zone of the furnace. A vertical shaft furnace with the feature described is adapted to prevent overexposure of softened expanded cellular particles to high temperatures and resulting degradation after the initial expansion has taken place.

With the above and other objects and features in view, the invention consists in the improved apparatus for heat expanding perlite which is hereinafter described and more particularly defined by the accompanying claims.

In the following description reference will be made to the attached drawings, in which:

Fig. 1 portrays in vertical section a preferred form of heat expanding furnace;

Fig. 2 is a view in horizontal section taken on the plane 2—2 of Fig. 1; and

Fig. 3 is an enlarged fragmentary vertical section of the furnace wall portraying wearing strips for the scraper.

Referring to the drawings, the preferred heat expanding furnace comprises an elongated cylindrical shaft furnace 10 mounted with its longitudinal axis vertical and provided with a cylindrical metal casing 12. The casing of the furnace is shown as lined with a refractory insulation lining 14. An inner shell portion 15 of the refractory insulation lining consists of heat expanded perlite deposited in situ thereon and built up and maintained at a uniform predetermined thickness during the operation of the furnace.

An annular gas or oil burner 16 is mounted at the top of the furnace and is supplied with a primary air-fuel mixture by pipe 18. The walls 17 of burner 16 are straight tubular walls disposed in vertical position, and the central axis of the burner is preferably located concentrically with, or parallel to, the longitudinal axis of the furnace 10. In furnaces of large capacity, several burners may be installed in order to avoid development of excessive turbulence by a single burner of small capacity.

Finely divided crushed raw perlite is introduced at a controlled rate from a source 20 into a straight walled vertical feed pipe 24. Pipe 24 is shown as mounted concentrically within the burner 16 and is ported out into the top of the furnace within a core of a combustion flame developed at the burner orifice. Secondary air for operating the burner may enter the furnace through apertures 23 at the top of feed pipe 24, and through preheating passages and ports 25 in the furnace lining.

A rotary wall scraper 26 is mounted within the furnace for the purpose of limiting the thickness and preserving the high heat radiating and insulating properties of the inner expanded perlite lining 15. The scraper 26 is a critical feature of the furnace enabling operation thereof on a continuous and efficient operating cycle. The scraper illustrated consists of a water cooled pipe which is mounted to rotate in a fixed path about the vertical axis of the furnace, and which is shaped to conform with the contour of the furnace lining 14 throughout the full length of the furnace. Scraper 26 is journaled in bearings 28 at the base of the shaft, and is supported by a roller bearing mounted sprocket drive member 30 at the top of the shaft. The actuating means for sprocket 30 consists of a motor driven drive chain or equivalent flexible drive means 32 whereby the sprocket may be rotated to thereby rotate the scraper to wipe the inner surface of lining 15 throughout its full area at speeds which are readily controlled. Cooling water for the scraper 26 is shown as delivered by a hose or pipe 34 through a stuffing box 36. Hot water is discharged from the bent over top of the scraper 26 into a water collecting ring 38, from which the water drains off through pipe 40. The wiping face of the scraper is shown as provided with wearing strips 42.

In the operation of the preferred apparatus, crude perlite is preferably pulverized to particles which are finer than standard 20 mesh screen. Optimum particle sizes range between —65 and +200 mesh. Burner 16 is operated to develop flame temperatures in the upper portion of the furnace higher than 1700° F. Finely divided perlite is fed into the core of the flame developed by the burner, after initial suspension in secondary air aspirated through port openings 23. The rate of perlite feed is controlled to develop a relatively thin dispersion of the perlite particles as a suspension in the carrier gas stream of hot combustion gases which moves downwardly through the furnace from the burner ports. Rapid heat softening and puffing or expansion of individual perlite particles is normally completed within a period of 2-4 seconds after the crude perlite particle initially issues from the lower end of feed pipe 24.

The carrier gas stream of expanded perlite particles which is thus developed within the upper portion of the furnace moves downwardly therethrough at a rate which is preferably controlled to develop substantially streamline flow throughout the length of the furnace 10. The carrier gas stream changes its flow direction from a vertical to a horizontal path just prior to exit from the bottom of the furnace into an offtake pipe 50. The rate of gas removal from the furnace through pipe 50 is under the control of a suction fan (not shown). Any unexpanded or incompletely expanded particles of heavier density than the fully expanded particles tend to be thrown out of the carrier gas as it changes direction, and are collected at the bottom of the shaft furnace. This heavier material can be removed by opening a hinged gate 54.

By maintaining a lining 15 of cellular heat expanded perlite within the heating section of the shaft furnace 10 which is continually wiped by the scraper 26, it is possible to produce a cellular expanded perlite product of high quality and in high yield while operating on an efficient and economical continuous heating cycle. For example a yield of at least 88–90% of the expandible material charged to the furnace has been developed on a continuous operating cycle, with recovery of a cellular expanded product averaging 2-3 pounds per cubic foot density. This high yield of a high quality product is obtained while operating the furnace at a capacity as high as 300 pounds of finely divided perlite charged to the furnace for each 1½ square feet of furnace cross section. When operating the furnace to develop optimum temperatures of about 2000–2100° F. in the heat expanding zone, the heat insulating and heat radiating properties of a cellular expanded perlite lining 15 of ⅛–¼ inch thickness are such as to maintain the temperatures within the heat expanding zone as much as 200–300° F. above those which can be developed within the heat expanding zone with the same fuel consumption, without the presence of said expanded perlite lining.

Relatively higher yields of a high quality product are obtained when operating the furnace with vertically downward or upward flow of the carrier gas stream of dispersed fine particles within the heat expansion zone. To develop substantially streamline downward flow, the flow velocity of the carrier gas stream and suspended particles is preferably limited to approximately 2 to 4 feet per second within the heat expanding zone. Also the rate of crude particle feed is preferably controlled to provide at least about 20 to 30 cubic feet of carrier combustion gas for each pound of crude perlite feed (at operating temperatures).

By rotating scraper 26 in the fixed path which parallels and is spaced about ⅛–¼ inch from the inner face of refractory lining 14, opportunity is given for heat softened expanded perlite particles which are thrown into contact with the furnace lining to adhere and collect thereon up to a thickness for the inner perlite lining 15 which is permitted by the scraper. Even when operating with preferred downward streamline flow of gas dispersed perlite particles through the heat softening and expansion zone of the furnace, approximately 10% of the heat softened perlite particles are thrown into contact with the inner face of the furnace lining 15, where they tend to cling and collect. The scraper should be rotated at speeds not substantially lower than 10 R. P. M., but is preferably operated at substantially higher speeds of say 90 R. P. M. A minimum linear speed for the scraper is about 50 feet per minute. The scraper operates to limit the thickness of the built up perlite lining 15 within definite dimensions, and to prevent coalescence of fused perlite or formation of dense clinkering material at the inner face of the lining. Since the scraper is water cooled, its periodic traverse of the inner lining 15 tends to lower the temperature of this face relative to the gas temperatures within the heat expanding zones of the furnace, and this cooling supplements the mechanical scraper action whereby optimum heat insulating and reflecting properties are preserved throughout the full area and thickness of the shell 15.

In suspending or starting up operation of the furnace, the scraper should be operated whenever the inner face of the expanded perlite lining 15 is at a temperature at or above the heat softening temperature of the perlite. In starting operation of the furnace, the burner 16 should be operated to slowly raise the furnace temperature to that suitable for flash heat expansion of perlite, and the initial rate of crude perlite feed to the burner should not substantially exceed half the maximum rate of feed until such time as the burner 16 is brought up to the capacity necessary to develope optimum temperatures for continuous heat expansion operation at maximum crude perlite feed rates.

The invention which has been thus described by detailed example is not limited as to such details and it is to be understood that variations, changes and modifications are contemplated within the scope of the invention as defined by the following claims.

What we claim is:

1. In perlite expanding apparatus, an elongated wall enclosed combustion chamber open at both ends, a burner ported out in one end of said chamber in the direction of its longitudinal axis, an exhaust pipe ported out of the other end of said chamber, means for introducing finely divided crude perlite in gas dispersed form into the chamber at the burner end thereof, and a mechanically actuated scraper shaped to conform with the inner lining of the chamber and movably mounted to periodically wipe the inner lining face of the chamber.

2. In perlite expanding apparatus, an elongated cylindrical heating chamber having a confining wall lining of adherent expanded perlite, a burner ported out in said chamber at one end thereof, an exhaust duct ported out in said chamber at the opposite end thereof, a feed duct for introducing a gas dispersion of finely divided crude perlite into the burner end of the chamber, and a water cooled pipe scraper rotatably journaled in the longitudinal axis of the chamber and shaped to wipe the inner face of the perlite lining throughout its area.

3. Apparatus for expanding finely divided perlite comprising, a heating chamber having a vertical confining wall lining forming an elongated heating zone, a supply duct for finely divided crude perlite ported out at one end of the chamber, an exhaust duct ported out of the chamber at the opposite end thereof, a fluid fuel burner concentric with the supply duct, and means including a scraper operable in a fixed path paralleling the lining face for periodically wiping a thin inner lining face of adherent heat expanded perlite particles throughout the full wall area of the heating chamber.

4. Apparatus for expanding perlite comprising, a vertical shaft furnace having an unobstructed heating zone in the direction of its major vertical axis and having a confining wall lining of substantially uniform thickness throughout comprising adherent expanded perlite, a supply duct for finely divided crude perlite ported out in the upper end of the furnace in the direction of its major axis, a fluid fuel burner mounted in the upper end of the furnace concentrically with respect to the perlite supply duct, an exhaust duct ported out of the chamber at the lower end thereof, the walls of the duct, burner and furnace being aligned to promote substantially streamline non-turbulent flow of perlite particles and combustion gases vertically downward throughout the length of the furnace chamber.

5. In apparatus for heat expanding granular perlite, a cylindrical combustion chamber, said chamber being mounted in a vertical position, a scraper comprising a water cooled pipe rotatably journaled in the longitudinal axis of the chamber and shaped to wipe the inside wall of the chamber throughout its area with a clearance of ⅛-¼ inch, a fuel burner mounted axially of the chamber at one end thereof in position to project a flame longitudinally of the chamber, an exhaust duct ported out of the chamber at the opposite end thereof, and means for charging granular perlite concentrically within the burner.

6. In apparatus for heat expanding perlite, a combustion chamber having a refractory insulation lining, a scraper comprising a water cooled pipe shaped to conform to the shape of the lining, said scraper being movably mounted to periodically wipe the surface of the lining while moving in a fixed path thereover, and a plurality of metal straps adhered in spaced, aligned relation to the wall bearing face of the scraper pipe as wear plates for the scraper.

7. In perlite expanding apparatus, an elongated wall enclosed combustion chamber, a burner ported out in one end of said chamber in the direction of its longitudinal axis, an exhaust pipe ported out of the other end of said chamber, means for introducing finely divided crude perlite into the chamber in the path of flame issuing from the burner, and a mechanically actuated scraper shaped to conform with the inner lining of the chamber and movably mounted to periodically wipe the inner lining face of the chamber while moving in a fixed path thereover.

WILLIAM L. STAFFORD.
EDWARD R. POWELL.

REFERENCES CITED

The following references are of record in the file of this patent:

UNITED STATES PATENTS

| Number | Name | Date |
|---|---|---|
| 501,215 | Schubert | July 11, 1893 |
| 1,276,866 | Boyle | Aug. 27, 1918 |
| 1,758,188 | Cordy et al. | May 13, 1930 |
| 1,868,512 | Ahlmann | July 26, 1932 |
| 2,044,680 | Gilbert | June 16, 1936 |
| 2,418,394 | Brown | Apr. 1, 1947 |